Figure 1:
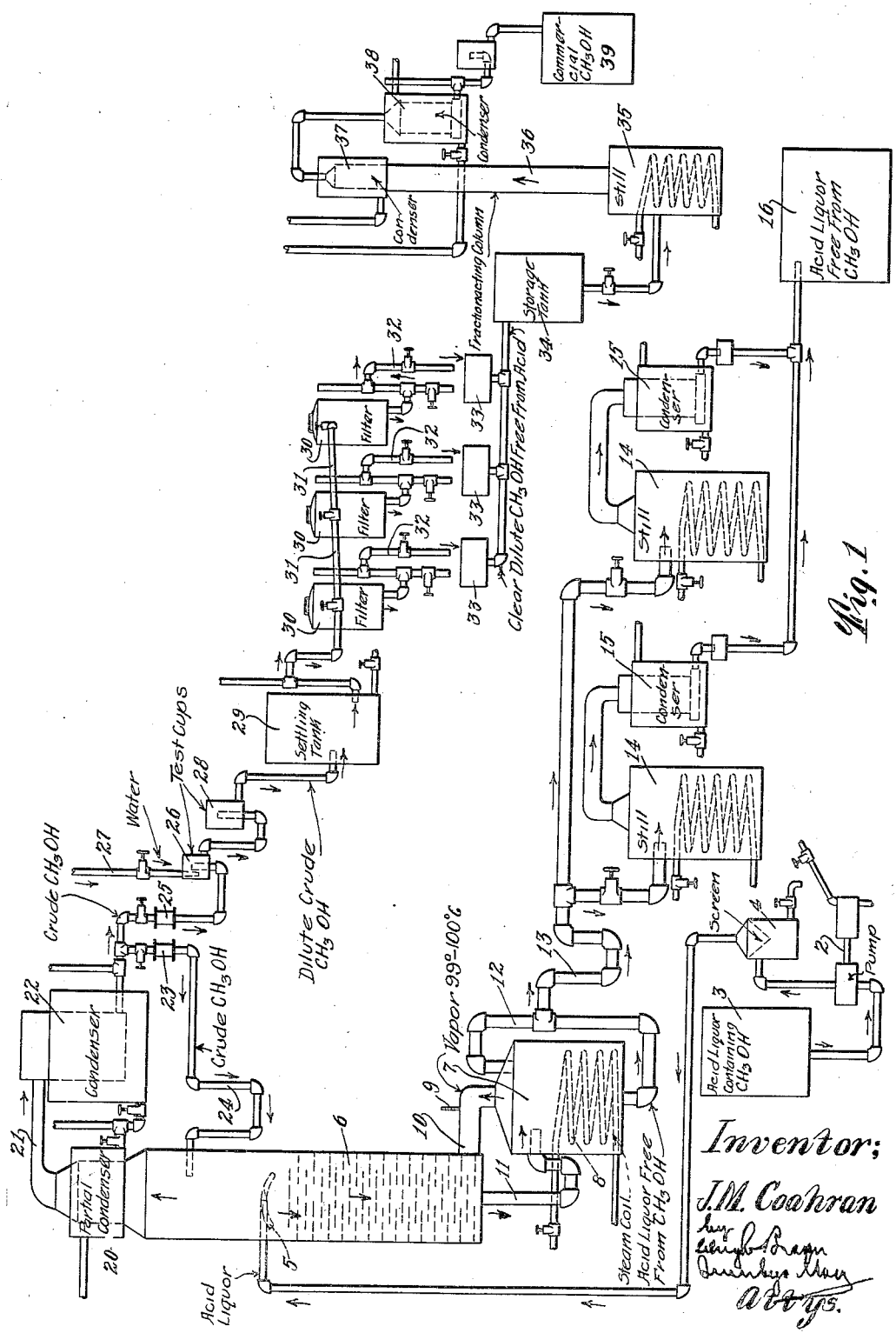

Dec. 9, 1930.  J. M. COAHRAN  1,784,270
METHOD OF REMOVING METHANOL FROM PYROLIGNEOUS ACID LIQUOR
Filed April 23, 1925  2 Sheets-Sheet 1

Inventor;
J. M. Coahran

Dec. 9, 1930.  J. M. COAHRAN  1,784,270
METHOD OF REMOVING METHANOL FROM PYROLIGNEOUS ACID LIQUOR
Filed April 23, 1925  2 Sheets-Sheet 2

Inventor;
J. M. Coahran

Patented Dec. 9, 1930

1,784,270

UNITED STATES PATENT OFFICE

JESSE M. COAHRAN, OF COLEGROVE, PENNSYLVANIA

METHOD OF REMOVING METHANOL FROM PYROLIGNEOUS ACID LIQUOR

Application filed April 23, 1925. Serial No. 25,312.

Pyroligneous acid liquor as obtained by the destructive distillation of wood contains various oils, tar, acetic and other acids, and methanol or wood alcohol. The object of this invention is the recovery and purification to commercial standards of the methanol content of such liquor.

As heretofore practiced the methanol has been recovered by distillation after the heavy insoluble tar has been removed from the liquor by decantation, most of the soluble oils removed by distillation and the acids neutralized with lime. The methanol as thus recovered is weak and impure and must be settled, decanted and re-distilled. Often, then, a considerable portion of the product is insufficiently pure to meet commercial standards and must be further treated, entailing considerable loss and expense. Not only is this process relatively involved and expensive, but it renders impossible the recovery of the acetic acid directly from the liquor. The present invention has been developed in order to avoid handling the methanol at the low concentration involved in the process as hereinbefore described, to avoid the necessity of the re-distillation of the considerable proportion of the acid after it has been concentrated, to make possible the removal of the methanol without previous neutralization of the acid so that the acid may be recovered directly, and to attain other advantageous ends as may hereinafter appear.

Briefly this process comprises treating the liquor, preferably after screening, with hot vapor to remove the methanol and then fractionating the vapor and methanol to remove the methanol at a fair concentration which leaves behind all but a very small amount of acetic acid so that the part removed is crude methanol only. This methanol is not sufficiently pure to meet commercial specifications since it contains some acid and oils in solution. This impure methanol is then diluted with water to about 20% to 25% (Tralles's scale). At about 27% concentration the oils no longer remain in solution, but form a cloudy emulsion. The material is then filtered through a medium capable of removing the emulsion and neutralizing the trace of acid and the filtrate is then fractionated to the required strength. The methanol so produced is found to meet standard crude methanol specifications, practically no fractions from the last frictionation requiring redistillation. Since this last fractionation is of methanol of fairly high concentration, the further concentration is relatively simple and inexpensive.

For a more complete understanding of this invention, reference may be had to the accompanying drawings in which Figure 1 is a diagrammatic representation of apparatus for carrying out the process.

Figure 2:
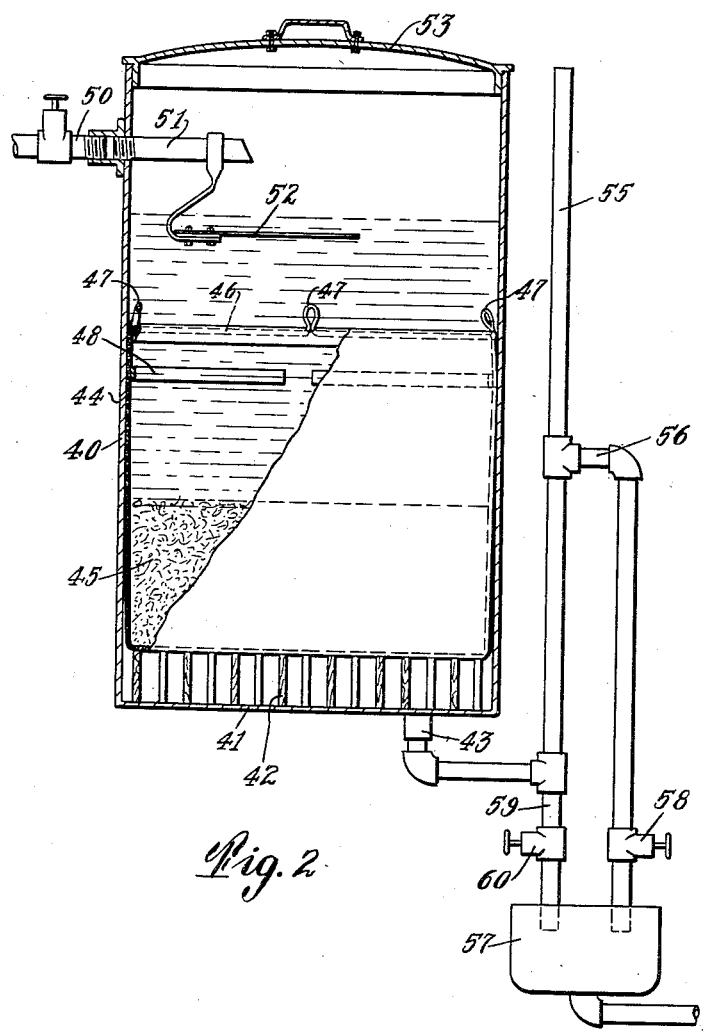

Figure 2 is a section partly broken away through one of the filters which may be used.

Referring to Figure 1, raw or distilled pyroligneous acid liquor containing the methanol is continuously pumped by means of a pump 2 from storage tubs, as at 3, through screens 4 to a distributor 5 intermediate the upper and lower ends of a fractionating column 6. The liquor passing down within the column is met by a large volume of hot vapors arising from a still or boiling head 7 which is provided with steam coils 8 having a large heating capacity. A thermometer 9 is placed in the vapor pipe 10 between the still and the column 6 to indicate the temperature of the vapors which should be maintained at about 99° C. to 100° C., this temperature being above the boiling point of pyroligneous acid containing methanol. When the liquor passing down the column meets the hot ascending vapors, the methanol is boiled and fractioned out and passes out from the column carrying with it some low boiling oils, water and small amounts of acid. The bulk of the liquor carrying high boiling oils, tars, and most of the acids and water passes through the trapped return line 11 to the still 7. By means of a trapped line 12 connected to both the top and bottom of this still to insure the same liquor level in the trapped line and in the still irrespective of pressure in the still, liquor free from methanol is drawn continuously off from the bottom of the still and is trapped through the line 13 to prevent the passage of vapors with the liquor. This liquor may be fed hot to stills 14, where it is distilled to remove from it the heavy oils and tars and may then be condensed in condensers 15 and passed to the storage tubs as at 16 where it is in condition to be treated for the direct recovery of the acetic acid, should this be desired.

The methanol with vapors passing up through the column 6 is concentrated by fractionation with the help of the partial condenser 20 and is passed through the vapor pipe 21 to the condenser 22. Methanol is removed from this condenser at a strength of 40% to 65% (Tralles's scale) and contains in solution considerable oils and from one-fourth to one-half of one per cent acid. At this point a portion of the condensed methanol may be returned to the column 6 through the sight glass 23 and the trapped reflux line 24 to aid in fractionation and in building up the strength of the methanol removed from the column 6.

It is found in practice that the higher the concentration of the methanol removed from the top of the column, the smaller the percentage of acid and oils removed with it, but if the concentration is raised too high some methanol may find its way down through the still 7 and pass off through the trapped line 13 and be lost.

Condensed methanol from the condenser 22 is drawn off through the sight glass 25 to an overflow test cup 26. The methanol at this point is clear, all the oils being in solution. Water is added through the pipe 27 to the methanol in the test cup to reduce the percentage of methanol in the mixture to about 20% to 25%. When the concentration of the methanol is thus reduced below about 27%, (Tralles's scale), the oils no longer remain in the solution but form a cloudy emulsion. From this test cup 26 the liquor passes to a second test cup 28 in order that the concentration may again be tested and from thence it passes to a settler 29. Some of the oils may settle out in this settler 29 from which they may be withdrawn, but most of them pass on to the series of filters at 30. It will be noted that the line 31 which supplies the liquor to these filters is upwardly inclined, communicating with the first filter of the series at a lower point and at each successive filter at an increasingly greater height. This arrangement insures that the first filter of the series shall be supplied with the liquor to be filtered to its capacity and if it is not of sufficient capacity, the liquor then rises in the pipe 31 to the next filter and fills this and if these two are not of sufficient capacity, the liquor rises to the next filter in the series. By this means the number of filters in use is automatically regulated to the amount of liquor to be filtered relative to the capacity of the individual filters. Thus, as the first filters of the series become clogged, those later in the series automatically become operative to take care of the supply of the liquor to be filtered. These filters contain material which is capable of retaining the cloudy emulsion and neutralizing the acid in the liquor so that the filtrate is a clear methanol liquor of a concentration of from 20% to 25% methanol.

A filtering material which has been found capable of accomplishing the results desired is calcium carbonate. The crude calcium carbonate which is the refuse from acetone plants manufacturing acetone from acetate of lime, has been found quite satisfactory. This material is sufficiently coarse grained to make an excellent filtering material, is nearly insoluble in water, and combines chemically with the trace of acids in the methanol liquor to form acetate of lime which is left in the residue in a still such as that shown at 35 which may be employed to concentrate the methanol from the filters.

It has been found desirable to maintain the filter beds submerged in the liquor during the filtering operation, consequently the filtrate is taken off through the trapped lines 32 from which it is collected by the receiving cups 33 and conducted to the storage tank 34. If the filters are properly functioning it is found that there is no settling of any material in the storage tank; otherwise some times small oily deposits will settle therein. The methanol as drawn off from the storage tank 34 may be fractionated and brought up to proper concentration by any suitable means, either by continuous or intermittent process. As shown the still 35 has been provided for this purpose, this still being provided with a fractionating column 36 and partial and complete condensers 37 and 38, respectively, the concentration being carried out in the well known manner, the concentrated methanol being passed to the storage tank 39. It is found that practically all of the product taken from the condensers of this fractionating column is sufficiently pure to meet commercial specifications for crude methanol, it being necessary to re-distill almost no fractions to obtain a sufficiently pure product.

The column 6 in which the initial separation of the methanol from the acid liquor takes place may be of any suitable type, though in practice it has been found desirable to employ a "plate" construction, the plates being provided with fairly large perforations so that the column does not readily become clogged. This has been found quite efficient and is reasonably cheap to construct.

While the filters 30 may be constructed in various ways, the construction shown in Figure 2 has been found quite satisfactory. Referring to this figure, it will be seen that the filter comprises a container or tank 40 having above its base 41 a false bottom 42 slatted or formed of hollow tile set on end or otherwise constructed to provide a free passage for the filtrate to the pipe 43. On this false bottom 42 rests a bag 44 of heavy jute or burlap shaped to fit within the container 40 and having the filtering material 45 therein. This bag 44 is provided with a rope bead 46 at its upper margin provided at intervals with loops 47 to facilitate the grasping of the bag by hooks of a hoisting device in order that the bag may be removed from the receptacle when it is desired to change the filtering medium. Beneath its upper edge this bag is held against the inner face of the container as by means of a split spring ring 48. The liquor to be filtered is supplied to the upper portion of the receptacle through a pipe 50 having a removable extension 51 positioned inside of the tank, this section 51 having supported therefrom a plate 52 to receive the liquor passing from the open end thereof to break the force of its fall. This plate 52, together with the pipe 51, may be removed to permit the bag and its contents to be readily removed from the receptacle when desired, without obstruction. The upper end of the tank is normally closed by means of a removable cover 53. The outlet pipe 43 communicates with a vertical pipe 55 intermediate the length of which is a branch pipe 56 leading downwardly to the receiving cup 57, the flow therein being controlled by a valve 58. The upper end of the pipe 55 is open to serve as a vent. Leading from the lower end of the pipe 55 is a connection 59 having a control valve 60, this pipe 59 also leading to the cup 57. The lines 55 and 56 form a trapped outlet for the liquid so as to maintain the filtering medium 45 entirely submerged, though in actual operation the level of the liquid may be considerably above this point, the upper limit of the level of the liquor being determined by the position of the inlet pipe to the last filter of the series which is in operation at any particular time. When the bag containing the filtering medium is to be removed, the filtering receptacle may be drained by opening the valve 60.

Having thus described the process according to this invention and disclosed by way of example an apparatus for carrying it into practice, it should be understood that various modifications and changes might be made without departing from the spirit or scope of this invention as defined by the appended claims.

I claim:

1. The method of producing purified methanol which comprises distilling off methanol from pyroligneous acid liquor and fractionating it to a concentration above substantially 27% (Tralles's scale), diluting the product with water sufficiently to cause the dissolved oils to pass out of solution, and then filtering out said oils.

2. The method of producing purified methanol which comprises subjecting pyroligneous acid liquor to fractional distillation to remove therefrom at a concentration above approximately 27% (Tralles's scale) methanol containing oil constituents in solution, diluting the distillate with water until such oil constituents go out of solution, and then separating the oil constituents from the dilute methanol.

3. The method of producing purified methanol which comprises subjecting pyroligneous acid liquor to fractional distillation to remove therefrom at a concentration of approximately 40% (Tralles's scale) methanol containing oil constituents in solution, diluting the distillate with water until such oil constituents go out of solution, and then separating the oil constituents from the dilute methanol.

4. The method of producing purified methanol which comprises distilling off methanol from pyroligneous acid liquor and fractionating it to a concentration above 27% (Tralles's scale), diluting the product with water sufficiently to cause its dissolved oils to pass out of solution, then filtering out said oils, and then concentrating the filtrate.

5. The method of producing purified methanol which comprises subjecting pyroligneous acid liquor to hot vapor to drive off methanol containing oil constituents, fractionating the methanol and vapor to concentrate the methanol to above approximately 27% (Tralles's scale), diluting with water to such a degree that the oil constituents go out of solution, and removing such constituents.

6. The method of producing purified methanol which comprises subjecting pyroligneous acid liquor to hot vapor to drive off methanol containing oil constituents, fractionating the methanol and vapor to concentrate the methanol to above approximately 27% (Tralles's scale), diluting with water to such a degree that the oil constituents go out of solution, removing such constituents, and then concentrating.

7. The method of producing purified methanol which comprises subjecting pyroligneous acid liquor to hot vapor to drive off methanol containing oil constituents, fractionating the methanol and vapor to concentrate the methanol to above approximately 27% (Tralles's scale), diluting with water to such a degree that the oil constituents go out of solution, and filtering through calcium carbonate.

8. The method of producing purified methanol which comprises subjecting pyroligneous acid liquor to hot vapor to drive off methanol containing oil constituents, fractionating the methanol and vapor to concentrate the methanol to above approximately 27% (Tralles's scale), diluting with water to such a degree that the oil constituents go out of solution, filtering through calcium carbonate, and fractionating to concentrate the methanol and leave behind the neutralized acid constituent.

9. The step in the recovery of methanol from pyroligneous acid liquor which comprises removing therefrom by fractional distillation crude methanol at a strength above 27% (Tralles's scale).

10. The step in the recovery of methanol from pyroligneous acid liquor which comprises removing therefrom by fractional distillation crude methanol at a strength of at least 40% (Tralles's scale).

In testimony whereof I have affixed my signature.

JESSE M. COAHRAN.